(12) United States Patent
Chen et al.

(10) Patent No.: US 8,786,698 B2
(45) Date of Patent: Jul. 22, 2014

(54) BLOW TRACKING USER INTERFACE SYSTEM AND METHOD

(75) Inventors: Ruxin Chen, Redwood City, CA (US); Steven Osman, San Francisco, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 343 days.

(21) Appl. No.: 12/889,347

(22) Filed: Sep. 23, 2010

(65) Prior Publication Data

US 2012/0075462 A1 Mar. 29, 2012

(51) Int. Cl.
*H04N 7/18* (2006.01)
*G01F 15/00* (2006.01)

(52) U.S. Cl.
USPC ............................................. 348/135; 702/50

(58) Field of Classification Search
USPC ................... 348/135, 699; 374/15, 104, 135; 382/192, 208
See application file for complete search history.

(56) References Cited

U.S. PATENT DOCUMENTS

| | | | |
|---|---|---|---|
| 4,996,161 A | 2/1991 | Conners et al. | |
| 5,689,241 A | 11/1997 | Clarke, Sr. | |
| 5,764,786 A | 6/1998 | Kuwashima et al. | |
| 5,994,701 A | 11/1999 | Tsuchimoto et al. | |
| 6,421,617 B2 * | 7/2002 | Felsenstein et al. | 702/50 |
| 7,477,309 B2 * | 1/2009 | Cuccias | 348/342 |
| 8,033,996 B2 * | 10/2011 | Behar | 600/300 |
| 8,218,871 B2 * | 7/2012 | Angell et al. | 382/181 |
| 8,638,364 B2 | 1/2014 | Chen et al. | |
| 2002/0017300 A1 | 2/2002 | Hickle et al. | |
| 2002/0083025 A1 | 6/2002 | Robarts et al. | |
| 2003/0108223 A1 | 6/2003 | Prokoski | |
| 2006/0264773 A1 | 11/2006 | Gannon | |
| 2006/0293606 A1 | 12/2006 | Tomita | |
| 2007/0180979 A1 | 8/2007 | Rosenberg | |
| 2007/0285510 A1 | 12/2007 | Lipton et al. | |
| 2008/0171596 A1 | 7/2008 | Hsu | |
| 2008/0318192 A1 | 12/2008 | Jones | |
| 2009/0247222 A1 | 10/2009 | Bonnat | |
| 2010/0063997 A1 | 3/2010 | Sako et al. | |
| 2010/0069774 A1 | 3/2010 | Bingham et al. | |
| 2010/0130873 A1 | 5/2010 | Yuen et al. | |
| 2010/0177968 A1 | 7/2010 | Fry et al. | |
| 2011/0081969 A1 | 4/2011 | Ikeda et al. | |
| 2011/0197263 A1 * | 8/2011 | Stinson, III | 726/4 |
| 2011/0267265 A1 * | 11/2011 | Stinson | 345/157 |
| 2012/0052469 A1 * | 3/2012 | Sobel et al. | 434/262 |
| 2012/0075462 A1 * | 3/2012 | Chen et al. | 348/135 |
| 2012/0075463 A1 * | 3/2012 | Chen et al. | 348/135 |

OTHER PUBLICATIONS

Murthy et al. Non-contact Monitoring of Breathing Function Using Infrared Imaging. Department of Computer Science, University of Houston, Technical Report No. UH-CS-05-09. Apr. 9, 2005 [ retrieved on Nov. 11, 2011]. Retrieved from the internet:URL: http://www.cs.uh.edu/docs/cosc/technical-reports/2005/05-09.pdf.
U.S. Appl. No. 12/969,501, filed Dec. 15, 2010.
PCT International Search Report dated Jan. 31, 2012 for international application No. PCT/US2011/052182.
PCT International Search Report dated Nov. 30, 2011 for international application No. PCT/US2011/045595.
Final Office Action mailed Jul. 9, 2013 for U.S. Appl. No. 12/969,501.
Non-Final Office Action mailed date Feb. 4, 2013 issued for U.S. Appl. No. 12/969,501.

* cited by examiner

*Primary Examiner* — Sath V Perungavoor
*Assistant Examiner* — Howard D Brown, Jr.
(74) *Attorney, Agent, or Firm* — Joshua D. Isenberg; JDI Patent

(57) ABSTRACT

A blow tracking user interface method and apparatus may detect an orientation of blowing of a user's breath and a magnitude of blowing of the user's breath. A blow vector may be generated from the orientation and magnitude of the blowing of the user's breath. The blow vector may be used as a control input in a computer program.

32 Claims, 5 Drawing Sheets

BLOW TRACKING USER INTERFACE SYSTEM AND METHOD

FIELD OF THE INVENTION

Embodiments of this invention are directed to user interfaces for control of computer systems and more specifically to user interfaces that track the blowing of a user's breath to provide control input to a computer program.

BACKGROUND OF THE INVENTION

There are a number of different control interfaces that may be used to provide input to a computer program. Examples of such interfaces include well-known interfaces such as a computer keyboard, mouse or joystick controller. Such interfaces typically have analog or digital switches that provide electrical signals that can be mapped to specific commands or input signals that affect the execution of a computer program.

Recently, interfaces have been developed for use in conjunction with video games that rely on other types of input. There are interfaces based on microphones or microphone arrays, interfaces based on cameras or camera arrays. Microphone-based systems are used for speech recognition systems that try to supplant keyboard inputs with spoken inputs. Microphone array based systems can track sources of sounds as well as interpret the sounds. Camera based interfaces attempt to replace joystick inputs with gestures and movements of a user or an object held by a user.

Different interfaces have different advantages and drawbacks. Keyboard interfaces are good for entering text but less useful for entering directional commands. Joysticks and mice are good for entering directional commands and less useful for entering text. Camera-based interfaces are good for tracking objects in two-dimensions but generally require some form of augmentation (e.g., use of two cameras or a single camera with echo-location) to track objects in three dimensions. Such augmentation can increase the cost of a camera-based system.

It would be desirable to provide an interface that is intuitive to use and is also relatively inexpensive to implement.

It is within this context that embodiments of the present invention arise.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Embodiments of the present invention implement a new user interface for computer programs based on the detection of blowing of the user's breath to provide a control input.

INTRODUCTION

The blowing of breath from either the mouth or nose is probably one of the easiest and most instinctive controls that a person possesses after birth. The history and the thermal residue of the breath can also be an important input for a user interface. One of the easiest and most cost effective ways to estimate information regarding the blowing of a user's breath can be achieved is through use of a thermal imaging camera. In embodiments of the present invention, the direction, timing, strength, and source location of the blowing of breath can be used to control a user interface or to control a graphic display, sound playback, or other mechanical or virtual device. The blowing of user's breath can serve as a kind of laser pointer without requiring the user to hold any external device by hand or attach any device to the user's body. The direction of the blowing of breath can be estimated from a thermal trail when one blows the air toward an arbitrary direction, which need not necessarily be perpendicular to the user's face. The direction of the blowing of breath can also mean whether the user breathes in or breathes out. Breath flow control is very important for learning singing, for mind meditation, or for expressing emotion. For example, in a video game implementation, the direction and intensity of flow of a user's breath can be used as a trigger for the direction and power of an avatar monster's breath power. The control of the breath of virtual creatures in the games with seemly no effort at all on the part of a player will have a profound impact on the perception and playability of the games.

EMBODIMENTS

Figure 1:
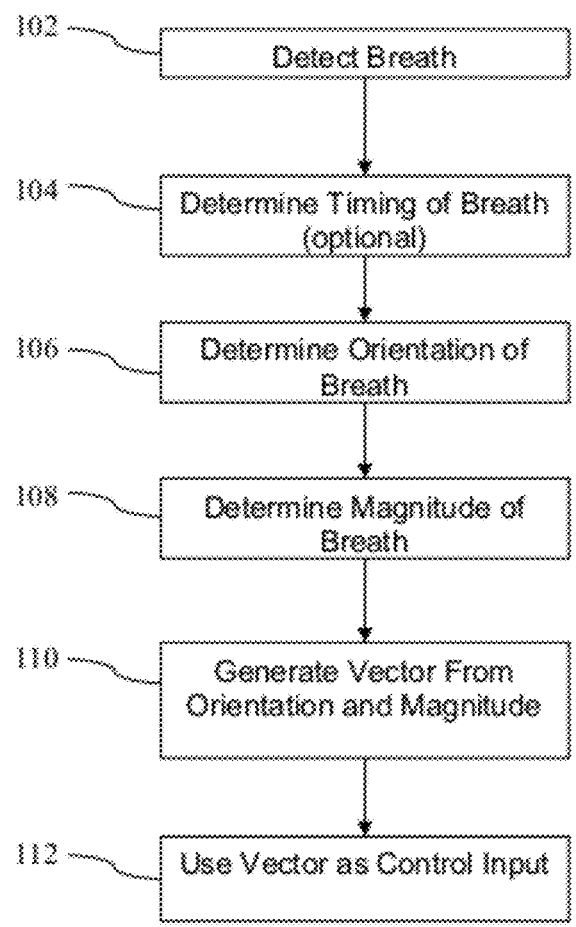
FIG. 1 is a flow diagram illustrating a blow tracking interface method according to an embodiment of the present invention.
Figure 2A:
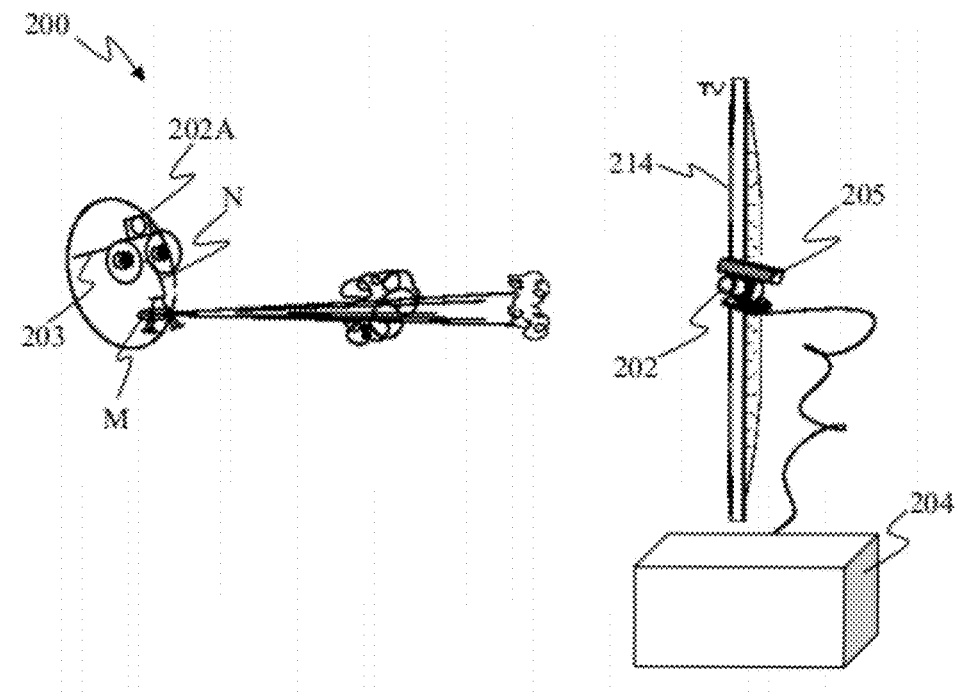
FIGS. 2A-2B are schematic diagrams illustrating use of a blow tracking interface according to an embodiment of the present invention.
Figure 2B:
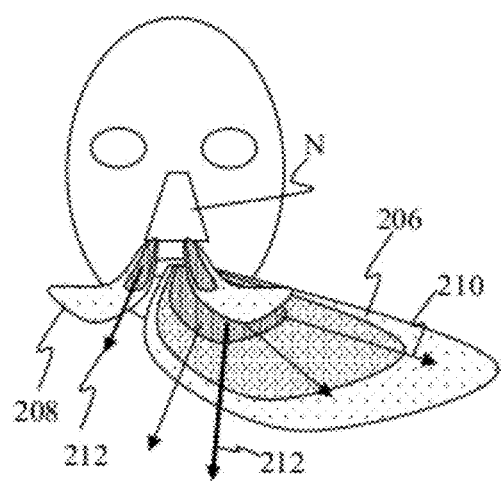

Examples of embodiments of the invention may be understood by referring simultaneously to FIG. 1 and FIGS. 2A-2B. FIG. 1 illustrates an example of a blow tracking interface method 100 in which the blowing of a user's breath is used to provide a control to a computer program. Specifically, the blowing of a user's breath is detected as indicated at 102. There are a number of ways in which the blowing of a user's breath may be detected. By way of example and not by way of limitation, FIG. 2A illustrates a possible system 200 that may be used to implement a breath tracking interface. The system generally includes a thermographic camera 202 coupled to a computer processing system 204. The thermographic camera may be positioned proximate a video display 214 that is coupled to the processing system 204 such that the user faces the camera when facing the display.

Use of a thermographic camera to track the blowing of a user's breath is particularly advantageous because it avoids the need to put sensors on body, e.g., to track the orientation of the user's head. This is particularly true since the orientation of the nose with respect to the face is substantially fixed. Although the shape of the mouth can be changed voluntarily in a relatively short time it is much harder to change the shape of the nose or the orientation of the nose relative to the face.

Consequently the nose breath vector 212 tends to blow in a fixed direction with respect to the face. Consequently, the nose breath vector can be used to determine the orientation of the user's face.

Blow detection using a thermographic camera or similar sensor is also advantageous in that it avoids the need for the user to hold a controller device by hand. This frees the user's hands for other tasks.

As used herein, a thermographic camera refers to a type of camera sometimes called a Forward Looking Infrared (FLIR) or infrared camera that forms an image using infrared radiation. The thermographic camera 202 forms an image using one or more lenses and a sensor in a fashion similar to a camera that forms an image using visible light. Instead of the 450-750 nanometer range of the visible light camera, an infrared camera can operate in wavelengths as long as 14,000 nm (14 µm).

The thermographic camera 202 can take advantage of the fact that all objects emit a certain amount of black body radiation as a function of their temperatures. Generally speaking, the higher an object's temperature, the more infrared radiation the body emits as black-body radiation. An infrared camera can detect this radiation in a way similar to an ordinary camera does visible light. However, since bodies emit infrared radiation even in total darkness, the ambient light level does not matter.

Embodiments of the present invention may use more than one thermographic camera. For example, two thermographic cameras may be used in a side-by-side configuration to provide stereoscopic (3D) images that can provide three-dimensional information. An equivalent thermographic "stereo" camera may be implemented in a single device having side-by-side lenses that image different views of the some scene onto a sensor or array of sensors. Multiple cameras might be used to create a three-dimensional representation of the breath volume and rate of flow (i.e., volume of breath flowing per unit time).

The thermographic camera 202 may use a cooled thermal sensor or an uncooled thermal sensor operating at ambient temperature, or a sensor stabilized at a temperature close to ambient using small temperature control elements. Modern uncooled detectors use sensors that detect changes of resistance, voltage or current when heated by infrared radiation. These changes can then be measured and compared to values at the operating temperature of the sensor. Uncooled infrared sensors can be stabilized to an operating temperature to reduce image noise, but they are not cooled to low temperatures and do not require bulky, expensive cryogenic coolers. This makes infrared cameras smaller and less costly.

Uncooled detectors are mostly based on pyroelectric and ferroelectric materials or microbolometer technology. These materials are used to form a detector having an array of pixels with highly temperature-dependent properties. These pixels can be thermally insulated from the surrounding environment and read electronically.

Ferroelectric detectors operate close to a phase transition temperature of the sensor material. The pixel temperature of the detector is calibrated to a highly temperature-dependent polarization charge on the detector material. The achieved noise equivalent temperature difference (NETD) of ferroelectric detectors with f/1 optics and 320×240 sensors can be 70-80 mK. An example of a possible ferroelectric sensor assembly consists of barium strontium titanate bump-bonded by polyimide thermally insulated connection. Other possible phase-change materials that can be used in infrared detectors include lanthanum barium manganite (LBMO), a metal insulator phase change material.

There is another possible detector that can detect small changes in the electrical resistance of a sensor material. Such a device is sometimes called a microbolometer. Microbolometers can reach NETD down to 20 mK. A typical microbolometer includes a thin film vanadium (V) oxide sensing element suspended on silicon nitride bridge above the silicon-based scanning electronics. The electric resistance of the sensing element can be measured once per frame.

It is noted that the location of the thermographic camera 202 is somewhat arbitrary in the example shown in the FIG. 2A. The thermographic camera 202 is placed on top of a video display facing a user. However, embodiments of the present invention are not limited to such a configuration.

The values of temperature (or temperature difference) at each pixel of the image sensor in the thermographic camera can be stored in a memory of the computer system 204 as an array. A program executed on the computer system 204 can analyze the temperature patterns in the array to identify a user's face and to identify thermal patterns that correspond to the blowing of a user's breath, e.g., by analyzing the evolution of thermal contours over time at locations corresponding to a user's mouth M and nose N. FIG. 2B illustrates an example of a thermal image showing thermal contours 206, 208 that correspond to the blowing of breath from the user's mouth and nose, respectively. In some embodiments, multiple synchronized thermal images from multiple cameras can be used to improve the resolution and location of the breath. The computer system 204 may analyze the evolution of the thermal contours 206, 208 over time to determine whether they exhibit patterns characteristic of a user's breath. Such characteristics may include the shape and size of the contours, the timing of changes in the contours, the gradient (or steepness) of the contours, and the location of the contours relative to features on the user's face, such as the mouth M and the nose N.

Such analysis can determine a timing of the blowing of breath, as indicated at 104. The timing of the blowing may include determining when a breath starts or stops, the duration of a breath, or the duration of not breathing, e.g., an interval between breaths. In some embodiments, the apparatus 200 may include an optional auxiliary sensor, such as microphone or microphone array 205 to provide sound signals that the computer system 204 can correlate to the blowing of the user's breath. In some embodiments, the microphone/microphone array 205 can be worn by the user. For example, the user may wear a headset having a boom to which the microphone 205 is attached. The boom can be configured so that the microphone 205 hovers right in front of the user's mouth and nose.

In some embodiments a second thermographic camera or conventional (i.e., visible light) camera, may be used as the auxiliary sensor to provide an additional source of information, e.g., thermographic, acoustic, or video image information, regarding the blowing of breath by the user. By way of example, and not by way of limitation, a separate one-dimensional or two-dimensional thermographic camera 202A may be mounted to a pair of glasses 203 worn by the user (e.g., a pair of 3D shutter glasses). The separate (additional) thermographic camera can obtain additional thermographic information related to the blowing of breath from the user's point of view. This additional thermographic information can be correlated to information from the main thermographic camera (or vice versa) to refine calculations regarding the timing, magnitude or orientation of blowing of breath by the user.

The thermal contours 206, 208 can be used to determine other information about the user's breath that can be used to control a program running on the computer system 204. By way of example, and not by way of limitation, an orientation of the blowing of breath may be detected, as indicated at 106 and a magnitude of the blowing of breath may be detected as indicated at 108. The orientation and magnitude can be used to generate a blow vector, as indicated at 110. The blow vector can then be used as a control input to a computer program running on the computer system 204 as indicated at 112.

By way of example, and not by way of limitation, detecting the orientation of breath at 106 may include determining a direction of breath, e.g., whether the breath is directed inward or outward (i.e., whether the breath is an inhale or exhale), a source of the breath, (e.g., whether the breath is emitted through the user's nose, mouth, or another part of the body or through an object such as a straw held to the user's lips. It is noted that the vector 110 is not limited to a 3-dimensional geometric vector. The vector 110 may include additional information regarding the blowing of breath. Such information may include information about the source of the breath, e.g., the nose N or the mouth M. For example, the vector 110 may include a component that characterizes the shape of the breath from an analysis of the contours 206, 208. A thin shape of air flow might indicate a whistle. There are a number of different ways to determine the magnitude of the blowing of breath. For example, the time evolution of the thermal contours may be analyzed to estimate the volume of air inhaled or exhaled in one breath, the speed of flow of one air during exhale or inhale, or by the amount of heat associated with a breath. Furthermore, some combination of air volume, air speed, or heat associated with breath may be used to determine the magnitude of the blowing vector 110.

In some embodiments the characteristics of the users mouth M can be used to indicate an orientation (e.g., direction) of the blowing vector 110. For example, a wide open mouth as opposed to pursed lips might indicate different blowing orientations. Information regarding the configuration of the user's mouth may be determined from analysis of the time evolution of thermal contours in thermographic images. The analysis may compare information derived from the contours (e.g., dimensions of contours, etc.) to reference information derived from thermographic images in which users' mouths are in known orientations.

In some embodiments the computer system 204 can be programmed to determine an intended "temperature" of the breath as possible orientation or magnitude of the breath. For example, when trying to warm the hands by blowing on them a person uses a heavy throaty breath from deep inside with a relatively open mouth. If the person is trying to cool soup by blowing on it, the person might blow gently through pursed lips. These different blowing configurations can be distinguished from analysis of the thermographic images to determine mouth orientation and/or breath flow rate. Images from a normal (i.e., visible light) camera can be used to help decide the intended "temperature" of the breath by providing some additional cues of the shape of the lip when the blowing happens. Furthermore, since these different types of blowing tend to have different characteristic sounds, it is also possible to determine these different intended breath "temperatures" from analysis of acoustic signals obtained with the microphone 205.

Another possibility is to measure the length of a trail of the blowing of breath from the contours 206, 208 and use that as an input for estimating the magnitude of the vector 110. Furthermore, the sound amplitude associated with the blowing of breath can also provide an input for estimating the magnitude of the vector 110. In certain embodiments, the contours 206, 208 may be analyzed to determine localized gradients at different places on the contours. In addition, the steepness of the thermal contours 206, 208 may be analyzed at different locations to determine not just the direction but also the magnitude of the localized gradients. Localized gradient vectors 210 can be generated from the directions and magnitudes of the localized gradients. The localized gradient vectors 210 may be averaged or otherwise combined to determine a general breath vector 212 indicating the magnitude and direction of the user's breath relative to the user's face. It is noted that separate general breath vectors 212 could generated for breath at the mouth and nose. These separate breath vectors may be used as separate control inputs for different purposes. In some embodiments, long term history information regarding the contours 206, 208, localized gradients, localized vectors 210, or general vector 212 may b e used to improve the calculation of the magnitude, location, or orientation of the blowing of breath. Such long term history may be captured over some finite number of previous breaths or some finite period of time, e.g. 1-30 seconds.

There are a number of different ways in which a breath control input such as a breath vector 212 may be used in a computer program. In general, the program may change its state of execution in response to a determined value of the orientation, magnitude or timing of the blow vector. By way of example, and not by way of limitation, the start of execution of a program or a subroutine within a program may be triggered when the orientation, magnitude or timing above or below a threshold value. Alternatively, the magnitude, orientation, or timing of the blow vector may determine the value of a variable that is used by the program.

Figure 3A:
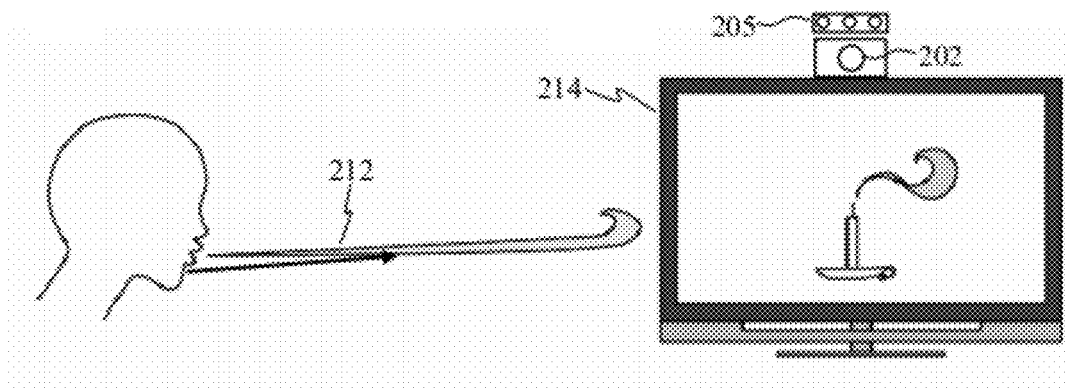
FIG. 3A is a schematic diagram illustrating use of a blow tracking interface according to an alternative embodiment of the present invention.

In a more general sense, the orientation, magnitude or timing of the blow vector may serve as inputs that control actions resulting from execution of the program. For example, a breath control vector can be used in a video game to direct a simulated projectile, e.g., as in a first person shooter game. Alternatively, the direction and magnitude of the breath can be used in a highly intuitive game situation, such as blowing out a candle, as seen in FIG. 3A. In this example, the orientation of the user's breath is determined relative to a video screen 214. It is also possible to use the relative change in direction of the blowing of breath from one breath to provide a directional input without reference to the video screen 214. This might be useful, e.g., in the case of a thermographic camera mounted to a pair of glasses worn by the user. The orientation of the user's breath relative to the video screen can be determined if the position and orientation of the camera 202 are known in relation to the position and orientation of the video screen 214. This can be accomplished, e.g., using a position sensor attached to the camera 202 that senses the position and orientation of the camera relative to the video screen. Given the direction of the breath and location of the user's mouth and/or nose relative to the video screen 214, it is easy to implement game play involving gun shooting or candle blowing using breath control. Furthermore, because one can blow to multiple directions, the functions of a conventional game controller's buttons and/or joystick(s) can be easily implemented while leaving the user's hands free.

Breath control can also be used to control the animation of avatars. A computer game program may map the timing and intensity of breathing to breath to an avatar controlled by a user so that avatar breathes in synchronization with user. Such an effect can enhance the realism of the game experience for the user.

Figure 3B:
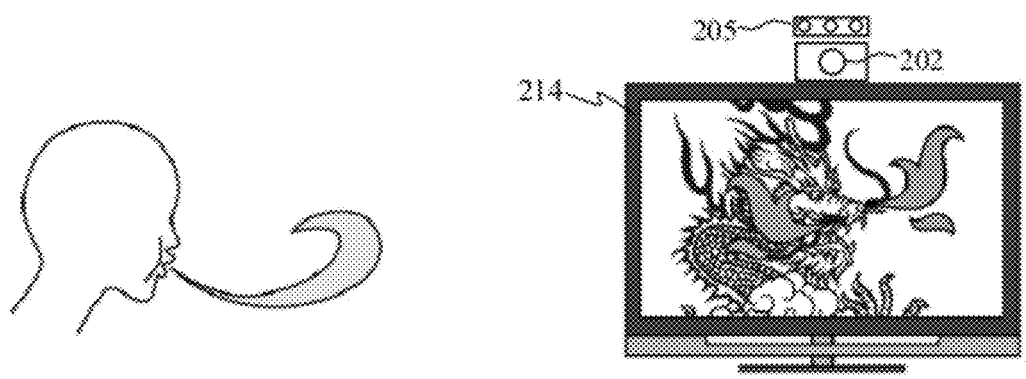
FIG. 3B is a schematic diagram illustrating use of a blow tracking interface according to another alternative embodiment of the present invention.

Breath-based control of avatars may also be used in more fanciful ways. For example, as depicted in FIG. 3B, a user's breath can be used in a video game in which the user controls a dragon avatar. The user's breathing can be used to synchronize certain actions of the dragon. For example, when the user breathes out with sufficient strength through the mouth and/or nose, the game program can trigger dragon's nose to emit out flames or smoke or some other special effect. In some embodiments, a user can customize the breath display pattern for an avatar to personalize the avatar in a game that is played over a network.

Another possible game implementation is a swimming game in which a user attempts to hold his breath while the user's avatar is underwater.

Embodiments of the invention may use a conventional keyboard or game controller in conjunction with a blow detector that detects the blowing of breath from a user to control multiple functionalities in an effortless fashion. In some embodiments a blow detector may be combined with a conventional input device. For example, a thermographic camera can be mounted to a keyboard or hand held game pad to provide breath information.

Figure 3C:
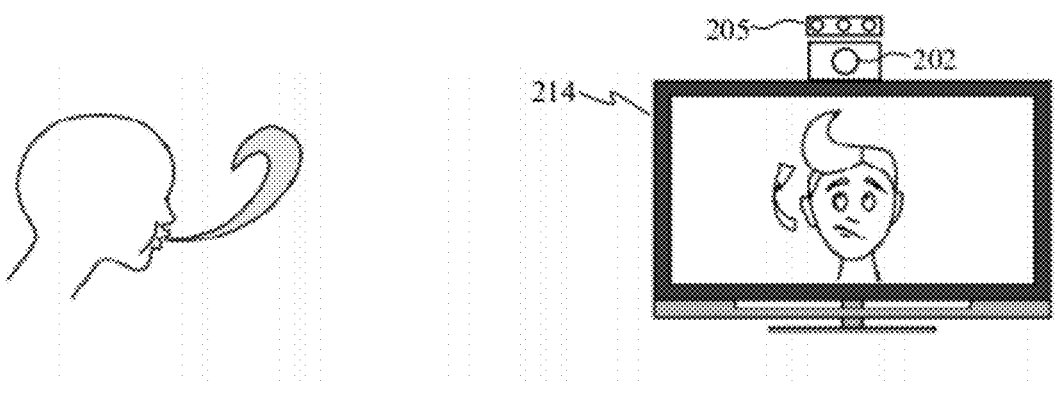
FIG. 3C is a schematic diagram illustrating use of a blow tracking interface according to another alternative embodiment of the present invention.

Embodiments of the present invention provide tremendously intuitive and versatile control for interactive computer applications. Control over the timing, strength, and direction of breath is highly intuitive. Furthermore, because one can "point" one's breath in directions other than perpendicular to one's face, breath-based controller's can be highly versatile. For example, one can stick out the lower lip or skew the low lip in order to blow the air upwards on one side of the face. In the example shown in FIG. 3C, this can be detected with a thermal imaging camera and mapped to an avatar. The direction and intensity of the breath determined from the thermal imaging can control a simulation in which the hair of avatar can be blown upwards or a fly in front of the avatar's forehead can be blown away.

Breath detection can also be used to provide feedback in exercise or meditation related applications. For example, control of breathing is an important feature of many forms of exercise and mediation, such as Chinese qi gong, or vocal breathing exercise for singing. A computer application that teaches these techniques may display an avatar to the user while detecting the timing, orientation, and magnitude of the user's breath. The avatar's chest may rise and fall in synchronization with the user's breathing providing important visual feedback to the user.

Breath tracking during sleep can be used to control playing of music to enhance sleeping and to keep monitor user's health. For example, faster music can be played to encourage heavier breathing. The blow vector 110 can be used in conjunction with computer programs that monitor and control snoring. The detection of the blowing of breath of a sleeping user can augment the detection of sounds captured with a microphone to filter out sounds that resemble snoring but are not related to the blowing of breath. Analysis of the information used to generate the blowing vector 110 can also provide insights into the severity and nature of the user's snoring. The richness of information used to generate the breath vector can also be used to help a doctor to diagnose a patient over a network, e.g., with graphics only.

It is noted that embodiments of the invention can be used for the diagnosis and treatment of sleeping disorders such as sleep apnea that are related to irregular breathing during sleep. Typically, the diagnosis of sleep apnea requires a patient to sleep at a sleep rehabilitation facility with many sensors attached to the patient's body. Use of a non-invasive means of breathing detection, such as the blow detection system described herein can allow the patient to undergo diagnosis at home.

Figure 4:
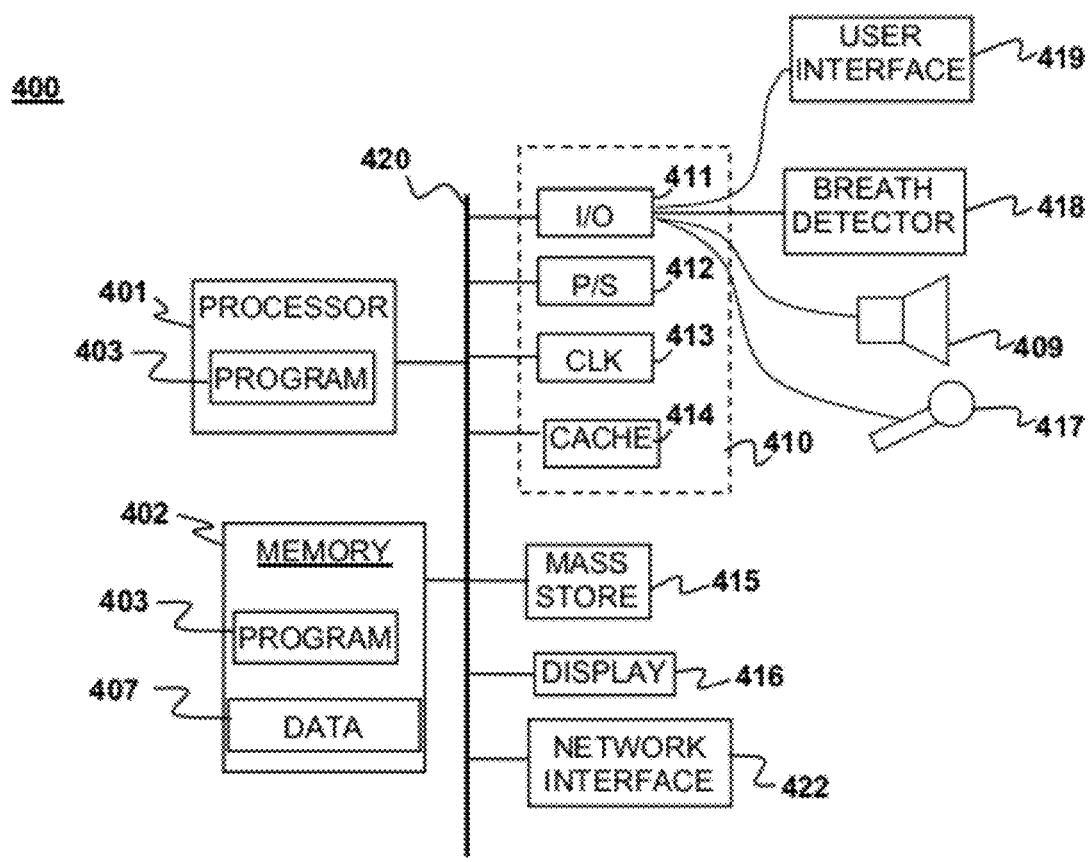
FIG. 4 is a block diagram depicting an example of a computer implemented apparatus that uses a blow tracking interface in accordance with an embodiment of the present invention.

FIG. 4 illustrates a block diagram of a computer apparatus 400 that may be used to implement picture decoding as described above. The apparatus 400 generally includes may include a processor module 401 and a memory 402. The processor module 401 may include one or more processor cores. As an example of a processing system that uses multiple processor modules, is a Cell processor, examples of which are described in detail, e.g., in Cell Broadband Engine Architecture, which is available online at http://www-306.ibm.com/chips/techlib/techlib.nsf/techdocs/1AEEE1270EA2776 387257060006E61BA/$file/CBEA_01_pub.pdf, which is incorporated herein by reference.

The memory 402 may be in the form of an integrated circuit, e.g., RAM, DRAM, ROM, and the like). The memory may also be a main memory that is accessible by all of the processor modules 401. In some embodiments, the processor module 401 may local memories associated with each core. A program 403 may be stored in the main memory 402 in the form of processor readable instructions that can be executed on the processor modules 401. The program 403 may include instructions configured to implement a breath tracking interface, e.g., as described above with respect to FIG. 1. In particular the program instructions may be configured to detect orientation and magnitude of the blowing of a breath, generate a blowing vector from the orientation and magnitude, and using the vector as a control input in the computer program 403 or some other program executed by one or more of the processor modules 401. The coder program 403 may be written in any suitable processor readable language, e.g., e.g., C, C++, JAVA, Assembly, MATLAB, FORTRAN and a number of other languages. During execution of the coder program 403, portions of program code and/or data 407 may be loaded into the memory 402 or the local stores of processor cores for parallel processing by multiple processor cores.

Input data 407 may be stored in the memory 402. By way of example, and not by way of limitation, the input data 407 may include data representing signals from a blow detector 418.

The apparatus 400 may also include well-known support functions 410, such as input/output (I/O) elements 411, power supplies (P/S) 412, a clock (CLK) 413 and cache 414. The apparatus 400 may optionally include a mass storage device 415 such as a disk drive, CD-ROM drive, tape drive, or the like to store programs and/or data. The device 400 may also optionally include a display unit 416 and the blow detector unit 418 and user interface 419 to facilitate interaction between the apparatus 400 and a user. The display unit 416 may be in the form of a cathode ray tube (CRT) or flat panel screen that displays text, numerals, graphical symbols or images.

The blow detector unit 418 includes a device that is sensitive to the orientation, magnitude, and (optionally) timing of a user's breath. In a preferred embodiment, the breath detector unit may include a thermographic camera, which may operate as described above with respect to FIG. 1 and FIGS. 2A-2B. The values of temperature (or temperature difference) at each pixel of an image sensor in the thermographic camera can be stored in the memory 402 as an array. The program 403 can analyze the temperature patterns in the array to identify a user's face and to identify thermal patterns that correspond to a user's breath, e.g., by determining thermal gradients. Thermal gradients can be used to determine a breath vector, which may be used as a control input.

The system 400 may optionally include one or more audio speakers 409 that are coupled to the processor 401 via the I/O elements 411. The speakers can play sounds generated in response to signals generated by execution of the program 403. The audio speakers 409 can be used, e.g., when the breath vector triggers the play back of sounds. In some embodiments, the system 400 may include an optional microphone 417, which may be a single microphone or a microphone array. The microphone 417 can be coupled to the processor 401 via the I/O elements 411. The program 403 can use sounds of a user's breath to augment the information from the blow detector 418 when determining the magnitude, direction, or timing of the blowing vector.

The user interface 419 may optionally include a keyboard, mouse, joystick, light pen, microphone, conventional digital camera, accelerometer, gyroscope, or other device that may be used in conjunction with the breath detector unit 418. The apparatus 400 may also include a network interface 422 to enable the device to communicate with other devices over a network, such as the internet. These components may be implemented in hardware, software or firmware or some combination of two or more of these. The breath vector information can be saved to memory and sent over a network to a doctor for diagnosis via the network interface 422.

Figure 5:
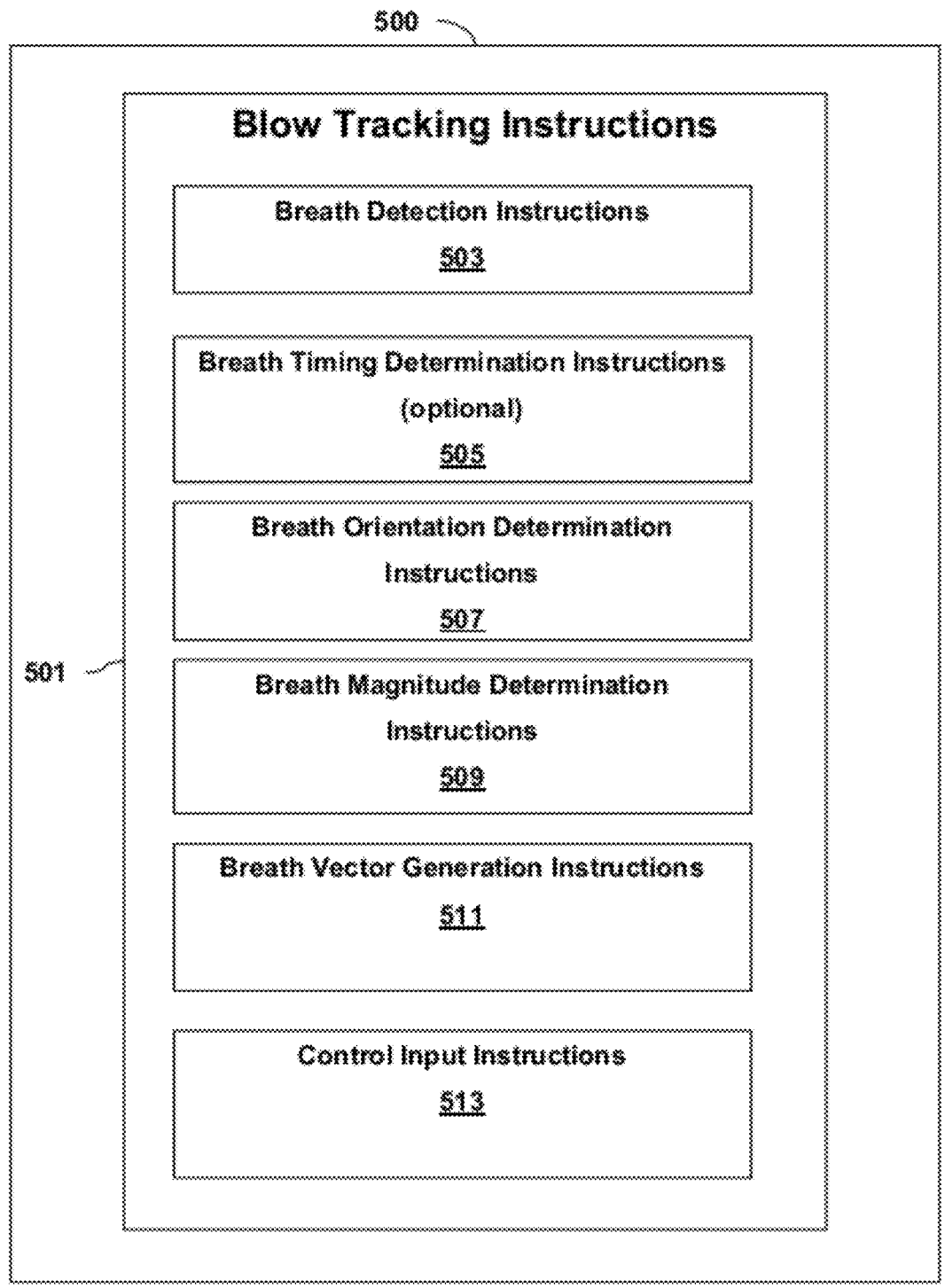
FIG. 5 is a block diagram illustrating a non-transitory computer readable medium containing computer-readable instructions for implementing a blow tracking interface method according to an embodiment of the present invention.

According to another embodiment, instructions for carrying out a blow tracking interface method may be stored in a computer readable storage medium. By way of example, and not by way of limitation, FIG. 5 illustrates an example of a non-transitory computer-readable storage medium 500 in accordance with an embodiment of the present invention. The storage medium 500 contains computer-readable instructions stored in a format that can be retrieved and interpreted by a computer processing device. By way of example and not by way of limitation, the computer-readable storage medium 500 may be a computer-readable memory, such as random access memory (RAM) or read only memory (ROM), a computer readable storage disk for a fixed disk drive (e.g., a hard disk drive), or a removable disk drive. In addition, the computer-readable storage medium 500 may be a flash memory device, a computer-readable tape, a CD-ROM, a DVD-ROM, a Blu-Ray, HD-DVD, UMD, or other optical storage medium.

The storage medium 500 contains blow tracking instructions 501 configured to implement a blow tracking interface. The breath tracking instructions 501 may be configured to implement breath tracking in accordance with the methods as described above with respect to FIG. 2A through FIG. 3C. Specifically, the breath tracking instructions 501 may include breath detection instructions 503 that detect blowing of a breath from a detector signal when executed on a processing device. The breath tracking instructions 501 may include breath timing determination instructions 505, breath orientation determination instructions 507, and breath magnitude determination instructions 509. When executed, these instructions respectively cause the processor to analyze the signal from the input device to determine the timing, orientation and magnitude from the detector signal.

The blow tracking instructions 501 may further include breath vector generation instructions 511 that generate a breath vector from the timing, orientation, and magnitude of the breath as determined by the breath timing determination instructions 505, breath orientation determination instructions 507, and breath magnitude determination instructions 509. The breath tracking instructions 501 may optionally include control instructions 513 that provide a control input to a computer program based on the breath vector.

There are many different possible ways of implementing and utilizing a blow tracking interface in addition to the ones described above. For example, according to certain alternative embodiments of the present invention may be applied to games that involve singing. Certain games exist in which a user sings along with a song that is played by a computer system. A microphone captures the sound of the user's voice. A computer program analyzes the sounds of the user's voice for singing of certain notes in the song by comparing the pitch of the voice to a reference pitch for the relevant note. However, matching pitch is not the only way, or even the best way to judge singing. Embodiments of the present invention can augment or even supplant judgment of singing based on pitch by following the timing of the user's breathing during singing. The computer program can analyze a signal from a microphone or IR camera to determine the timing and depth of the user's breathing. The timing of the user's breathing can be detected for both the inhale and the exhale during singing. The program can then compare the timing of the user's breathing against a reference breathing pattern for a given song to provide better evaluation of the singing scores. The program can also instruct a user when to exhale and when to inhale during singing.

Although the above-described embodiments utilize a thermal imaging camera to detect breath, embodiments of the invention encompass other ways to detect breath, such as with a microphone or by observing the deflection of sensor, such as a feather or piece of tissue paper with a video camera. Consequently, embodiments of the present invention are not limited to the use of a thermal imaging camera to detect breath. Alternatively, embodiments of the present invention may use other apparatus, such as one or more microphones to detect breath, e.g., as a joystick. For example, a user might wear a headset having a microphone to detect the timing and amplitude of the user's breath the headset could also include an inertial sensor, such as an accelerometer, to detect the orientation of the user's head. The orientation of the user's head can be used to determine the direction of the breath vector and signals from the microphone can be filtered to isolate breath sounds. The timing and magnitude of the breath vector can be determined from analysis of the breath sounds.

In some embodiments, breath detection may be used for computer program security. Breath detection can confirm that a verbal passcode is being spoken by person speaking it. This would make it more difficult to defeat a verbal passcode system, e.g., through playback of a recording of a user speaking the passcode.

Embodiments of the present invention can also use a thermal imaging camera or other breath detector to augment speech detection. A change in a user's breathing pattern can be used to determine when the user is speaking. It is also to use breath detection in a crowd of users (e.g., by using a thermal imaging camera) to detect which user in the crowd is speaking.

In other embodiments, one can use a thermal imaging camera or other means to detect a user's breath and to subtract the sounds of the breath from a microphone signal to reduce speech noise.

In further embodiments it is possible to use a thermal imaging camera to detect vibration patterns in the air around a user's mouth that correspond to the sounds of the user's voice during speech. The vibration patterns can be analyzed used to augment or supplant speech recognition based on speech input signals from a microphone.

Although the present invention has been described in considerable detail with reference to certain preferred versions thereof, other versions are possible. For example, although certain embodiments are described in which the breath tracking interface generates a breath vector from a magnitude and direction of a breath, embodiments of the invention may include implementations in which the breath tracking is implemented according to some other method, e.g., one not involving magnitude of the breath or not involving orientation of the breath. In addition, certain embodiments may rely upon timing of the breath independent of direction or magnitude to provide a control input. Therefore, the spirit and scope of the appended claims should not be limited to the description of the preferred versions contained herein. Instead, the scope of the invention should be determined with reference to the appended claims, along with their full scope of equivalents.

All the features disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features. Any feature, whether preferred or not, may be combined with any other feature, whether preferred or not. In the claims that follow, the indefinite article "A", or "An" refers to a quantity of one or more of the item following the article, except where expressly stated otherwise. Any element in a claim that does not explicitly state "means for" performing a specified function, is not to be interpreted as a "means" or "step" clause as specified in 35 USC §112, ¶6. In particular, the use of "step of" in the claims herein is not intended to invoke the provisions of 35 USC §112, ¶6.

The reader's attention is directed to all papers and documents which are filed concurrently with this specification and which are open to public inspection with this specification, and the contents of any papers and documents incorporated herein by reference.

What is claimed is:

1. A blow tracking interface method for control of a computer program, comprising:
   detecting an orientation of blowing of a breath, wherein detecting the orientation includes determining a three-dimensional direction towards which the blowing of the breath is pointed other than whether the breath is directed inward or outward;
   detecting a magnitude of blowing of the breath;
   generating a blow vector from the orientation and the magnitude, wherein the orientation of the blow vector includes the determined direction, wherein generating the blow vector includes generating a three-dimensional geometric vector from the determined three-dimensional direction; and
   using the blow vector as a control input in a user interface of the computer program.

2. The method of claim 1, further comprising determining a timing of the blowing of the breath, wherein the timing of the blowing of the breath determines timing of an action in the computer program.

3. The method of claim 1, wherein detecting the orientation and/or magnitude of the blowing of the breath includes obtaining one or more thermal infrared images of a user with one or more thermographic cameras, analyzing the one or more infrared images, and identifying one or more patterns in the one or more images corresponding to the blowing of breath from the one or more thermal infrared image.

4. The method of claim 1 wherein detecting the orientation of blowing of the breath includes determining towards which direction a blowing of the breath through a user's nose is pointed, wherein generating a blow vector includes generating a nose breath vector from the determined direction of the breath through the user's nose and determining how the user's face is orientated from the determined direction in the nose breath vector.

5. The method of claim 1, wherein detecting the orientation and/or magnitude of the blowing of the breath includes detecting sounds of the blowing of the breath with a microphone.

6. The method of claim 1 wherein detecting the orientation of the breath includes determining a source of the blowing of the breath.

7. The method of claim 1, further comprising mapping the timing and intensity of a user's breathing to simulated breathing of an avatar controlled by a user so that the avatar appears to breathe in synchronization with user.

8. The method of claim 1 wherein detecting orientation of a breath includes determining whether a user is blowing breath through the user's mouth or nose.

9. The method of claim 1 wherein detecting the orientation of a breath further includes determining whether a blowing of the breath is inward or outward.

10. The method of claim 1 wherein detecting orientation or magnitude of a breath includes determining an intended temperature of the breath.

11. The method of claim 1 wherein using the blow vector as a control input includes using the determined direction of the breath as a directional command in the computer program.

12. The method of claim 1 wherein using the blow vector as a control input includes using the magnitude of the breath to determine the magnitude of an action taken by the computer program.

13. The method of claim 1 wherein the orientation of the breath is determined relative to a video display.

14. The method of claim 1 wherein generating the blow vector includes using a past breath history to improve an estimation of the blow vector.

15. The method of claim 1, wherein said using the blow vector as the control input in the user interface includes using the control input to control a graphic display presented to the user.

16. The method of claim 1, wherein said using the blow vector as the control input in the user interface includes using the control input to control a sound playback presented to the user.

17. The method of claim 2, further comprising synchronizing timing of actions in the computer program to the timing of the blowing of breath.

18. The method of claim 3 wherein detecting the orientation and/or magnitude of the breath includes analyzing thermal contours in the one or more thermal infrared images, identifying one or more patterns characteristic of the blowing of the breath from the thermal infrared image, and determining the orientation from the one or more patterns.

19. The method of claim 3, wherein the thermographic camera is mounted to a pair of glasses worn by the user.

20. The method of claim 3, wherein generating the blow vector includes augmenting information obtained from the one or more thermal infrared images with information relating to the breath from one or more auxiliary sensors.

21. The method of claim 3, wherein the one or more thermographic cameras include one or more three-dimensional thermographic cameras, wherein obtaining the one or more thermal infrared images includes obtaining one or more stereoscopic infrared images of blowing of the breath, and wherein analyzing the one or more infrared images includes determining from the one or more stereoscopic infrared images a three-dimensional orientation of a thermal trail of breath in the one or more infrared images.

22. The method of claim 20, wherein the one or more auxiliary sensors includes a microphone or camera.

23. The method of claim 20, wherein the one or more auxiliary sensors includes an additional thermographic camera mounted to a pair of glasses worn by the user.

24. The method of claim 6 wherein determining the source of the breath includes determining which user from among a plurality of users is the source of the blowing of the breath.

25. The method of claim 6 wherein determining the source of the breath includes determining whether the source of the blowing of the breath is a user's mouth or nose.

26. A blow tracking interface apparatus for control of a computer program, comprising:
   a blow detector configured to detect one or more signals corresponding to blowing of a breath; and
   a processor coupled to the blow detector, wherein the processor is configured to determine an orientation and a magnitude of the blowing of the breath from the one or more signals, wherein the processor is configured to determine the orientation by determining a three-dimensional direction towards which the blowing of the breath is pointed other than whether the breath is inward or outward, and generate a blow vector from the orientation and the magnitude, wherein the orientation of the blow vector includes the determined direction, wherein generating the blow vector includes generating a three-dimensional geometric vector from the determined three-dimensional direction, wherein the processor is configured to use the blow vector as a control input in a user interface of the computer program.

27. The apparatus of claim 26 wherein the breath detector includes one or more thermographic cameras.

28. The apparatus of claim 26 wherein the blow detector includes one or more microphones.

29. The apparatus of claim 27, wherein the processor is configured to detect the orientation and/or magnitude of the breath by analyzing thermal contours in one or more infrared images captured by the one or more thermographic cameras to identify one or more patterns characteristic of the breath from the thermal infrared image.

30. The apparatus of claim 27 wherein the one or more thermographic cameras include a thermographic camera mounted to a video display that is coupled to the processor.

31. The apparatus of claim 27 wherein the one or more thermographic cameras include a thermographic camera mounted to a pair of glasses.

32. A non-transitory computer readable medium having computer executable instructions embodied therein, wherein the instructions are configured to implement a blow tracking interface method for control of a computer program when executed by a computer processor, wherein the method implemented by the execution of the instructions comprises:
   detecting an orientation of blowing of a breath, wherein detecting the orientation includes determining a three-dimensional direction towards which the blowing of the breath is pointed other than whether the breath is directed inward or outward;
   detecting a magnitude of blowing of the breath;
   generating a blow vector from the orientation and magnitude, wherein the orientation of the blow vector includes the determined direction, wherein generating the blow vector includes generating a three-dimensional geometric vector from the determined three-dimensional direction; and
   using the blow vector as a control input in a user interface of the computer program.

* * * * *